United States Patent
Hosler

(10) Patent No.: US 10,011,235 B2
(45) Date of Patent: Jul. 3, 2018

(54) RELEASABLE LADDER LOCKING SYSTEM

(71) Applicant: Daniel William Hosler, Sparland, IL (US)

(72) Inventor: Daniel William Hosler, Sparland, IL (US)

( * ) Notice: Subject to any disclaimer, the term of this patent is extended or adjusted under 35 U.S.C. 154(b) by 46 days.

(21) Appl. No.: 15/147,564

(22) Filed: May 5, 2016

(65) Prior Publication Data

US 2016/0325690 A1 Nov. 10, 2016

Related U.S. Application Data

(60) Provisional application No. 62/157,147, filed on May 5, 2015.

(51) Int. Cl.
*B60R 9/048* (2006.01)

(52) U.S. Cl.
CPC .................. *B60R 9/0485* (2013.01)

(58) Field of Classification Search
CPC ..... B60R 9/048; B60R 9/0485; B60R 9/0423; B60R 2011/0071; B60R 9/12; B60R 9/04; B60R 9/058; Y10S 224/9175
USPC ... 224/535–536, 324, 42.38, 42.4, 570, 456, 224/461, 309, 315, 917.5; 248/292.14, 248/296.1
See application file for complete search history.

(56) References Cited

U.S. PATENT DOCUMENTS

| | | |
|---|---|---|
| 2,134,823 A | 11/1938 | Herrmann et al. |
| 3,826,390 A | 7/1974 | Watson |
| 3,877,624 A | 4/1975 | Carson |
| 4,008,838 A | 2/1977 | Correll |
| 4,827,742 A * | 5/1989 | McDonald ............ B60R 9/0485 182/127 |
| 5,154,258 A * | 10/1992 | Krukow ................ B60R 9/0485 182/127 |
| 5,186,588 A * | 2/1993 | Sutton ................... B60R 9/0485 182/127 |
| 5,190,195 A * | 3/1993 | Fullhart .................... B60R 9/10 224/497 |
| 5,236,172 A * | 8/1993 | Friemoth ................ F16K 35/06 137/385 |
| D356,166 S | 3/1995 | Spiller |
| D364,082 S | 11/1995 | Weinerman |

(Continued)

OTHER PUBLICATIONS

International Search Report and Written Opinion from PCT/US2016/030999 dated Aug. 11, 2016 (9 pages).

*Primary Examiner* — Scott McNurlen
(74) *Attorney, Agent, or Firm* — McDermott Will & Emery LLP

(57) ABSTRACT

A ladder locking system that secures an extension ladder to an accessory rack mounted to a vehicle to define a secured position is provided. The secured ladder is prevented from moving fore or aft relative to the rack. The secured ladder is also prevented from moving laterally relative to the rack and vehicle by the downwardly directed force and engagement provided by the locking system. The locking system is movable to a released position wherein the ladder is not engaged by the locking system and thus can be removed from the ladder rack by an operator. An intermediate position occurs when the operator actuates the locking system between the secured and released positions depending upon whether the ladder is being readied for securement in the rack or being readied for removal from the rack.

24 Claims, 7 Drawing Sheets

(56) References Cited

U.S. PATENT DOCUMENTS

| | | | |
|---|---|---|---|
| 5,626,373 | A | 5/1997 | Chambers |
| 5,628,381 | A | 5/1997 | Markovich |
| 5,918,488 | A | 7/1999 | Deeter |
| 6,397,644 | B1 | 6/2002 | Gidding |
| 6,523,730 | B2 | 2/2003 | Anderson |
| D574,219 | S | 8/2008 | Griffith |
| D630,769 | S | 1/2011 | Capelle |
| 8,235,175 | B1 | 8/2012 | Feldhaus |
| 2001/0007627 | A1 | 7/2001 | Chasen |
| 2003/0034206 | A1 | 2/2003 | Carroll |
| 2005/0128442 | A1* | 6/2005 | Huff ................. B60R 9/0485 353/119 |
| 2005/0241879 | A1 | 11/2005 | Hickey |
| 2006/0283663 | A1 | 12/2006 | Fenner |
| 2013/0240586 | A1* | 9/2013 | Liu ..................... B60R 9/10 224/485 |

\* cited by examiner

RELEASABLE LADDER LOCKING SYSTEM

CROSS-REFERENCE TO RELATED APPLICATIONS

The present application claims the benefit of priority under 35 U.S.C. § 119 from U.S. Provisional Patent Application Ser. No. 62/157,147 entitled "RELEASABLE LADDER LOCKING SYSTEM," filed on May 5, 2015, the disclosure of which is hereby incorporated by reference in its entirety for all purposes.

TECHNICAL FIELD

This invention relates to a unique releasable ladder locking system that releasably secures a ladder or a similar structure to an accessory rack mounted to a vehicle, such as a truck or van. The locking system also features a durable construction and interlock mechanism that deters theft of the ladder.

BACKGROUND

Ladder racks are used by a variety of people, including contractors and tradesmen, to secure ladders and other elongated structures to vehicles, such as flatbed trucks, pick-up trucks or vans. The ladder racks are typically secured to each side of the truck bed or van roof whereby the vehicle has both a left rack and a right rack. Conventional ladder racks include a collection of support members, including a primary vertical member, a horizontal member that supports the ladder, a secondary vertical member that extends from an inner end of the horizontal member, and at least one cross member extending between the primary vertical member and the horizontal member to provide support thereto. The left and right racks each comprise a front rack and a rear rack, which helps to distribute the weight of the ladders that are secured thereto. When the vehicle has both left and right racks, the racks provide a total of four support points: left front, left rear, right front and right rear.

Because the vehicle is driven to and from various locations, including storage locations and worksites, it is imperative that the ladders be properly secured to the rack. If a ladder dislodges from the rack while the vehicle is being driven down a road, damage to the ladder, the rack, the vehicle, other vehicles and/or nearby property can occur. This problem is heightened by the fact that commercial ladders, racks and vehicles used by contractors and tradesmen are expensive and any time spent to repair them negatively impacts the finances of the business that owns and operates these items.

Conventional means for securing ladders to racks include rope, tie-down straps and bungee cords, but they suffer from a number of significant limitations. First, the process of securing an extension ladder to a rack with conventional means is very time consuming because the rope, strap or bungee cord is fed through or around a number of ladder rungs and side rails before being secured. Second, human error can reduce the efficiency of the securement process and introduce errors in feeding the rope, strap or bungee cord through and/or around the ladder and nearby rack, which compromises the reliability of the securement. Third, rope, strap and bungee cords are prone to wear and reduced reliability, especially since these conventional means are exposed over time to harsh weather conditions in the environment. Finally, rope, strap and bungee cords can be easily severed by cutting them, which can lead to unauthorized use or theft of the valuable ladders.

Accordingly, there is a long-standing need for a durable ladder locking system that releasably secures a ladder to a vehicle rack in a time efficient manner while deterring theft and misuse of the ladder.

SUMMARY

The present invention is directed to a ladder locking system that secures an extension ladder to an accessory rack mounted to a vehicle to define a secured position, wherein the ladder is prevented from moving fore or aft relative to the rack. The ladder is also prevented from moving laterally relative to the rack and vehicle by the downwardly directed force and engagement provided by the locking system. The locking system is movable to a released position wherein the ladder is not engaged by the locking system and thus can be removed from the ladder rack by an operator. An intermediate position (not shown) occurs when the operator actuates the locking system between the secured and released positions depending upon whether the ladder is being readied for securement in the rack or being readied for removal from the rack.

According to one aspect of the invention, the locking system includes a frame arrangement comprised of a first elongated segment, a second elongated segment and a releasable securing mechanism that is configured to engage and retain the ladder in the secured position. The releasable securing mechanism comprises a spring, a handle and a securing member, which is preferably configured as a hook dimensioned to engage at least one rung of the ladder. The handle is actuated by the operator to move the hook between the secured and released positions while the spring exerts a downwardly directed biasing force on the hook (and ladder rung) in the secured position.

According to another aspect of the invention, the locking system includes an interlock mechanism that is configured to receive an extent of the handle when the system is in the secured position to prevent movement from the secured position to the released position which prevents unexpected or unauthorized removal of the ladder. The interlock mechanism comprises a lower portion of the first segment and a movable flap that collectively form a channel that receives an extent of the handle in the secured position. A locking pin and ring extend across the channel and limits unwanted downward movement of the handle within the channel.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
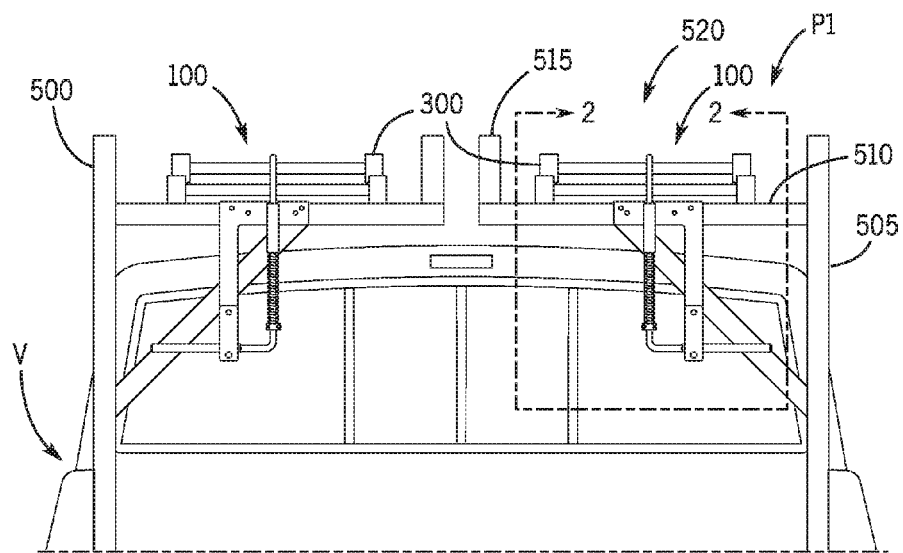
FIG. 1 is a front elevation view of one or more embodiments of a ladder locking system securing a ladder to a ladder rack mounted on a vehicle.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
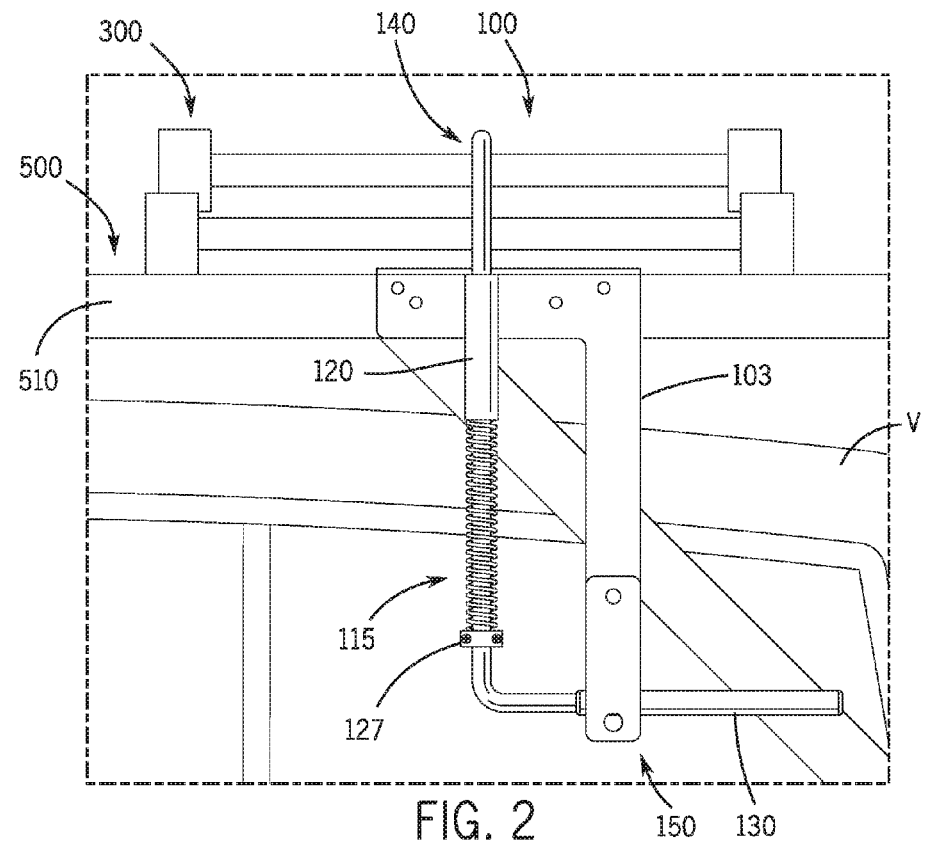
FIG. 2 is an enlarged front elevation view of a portion of the ladder locking system of FIG. 1.
Figure 3:
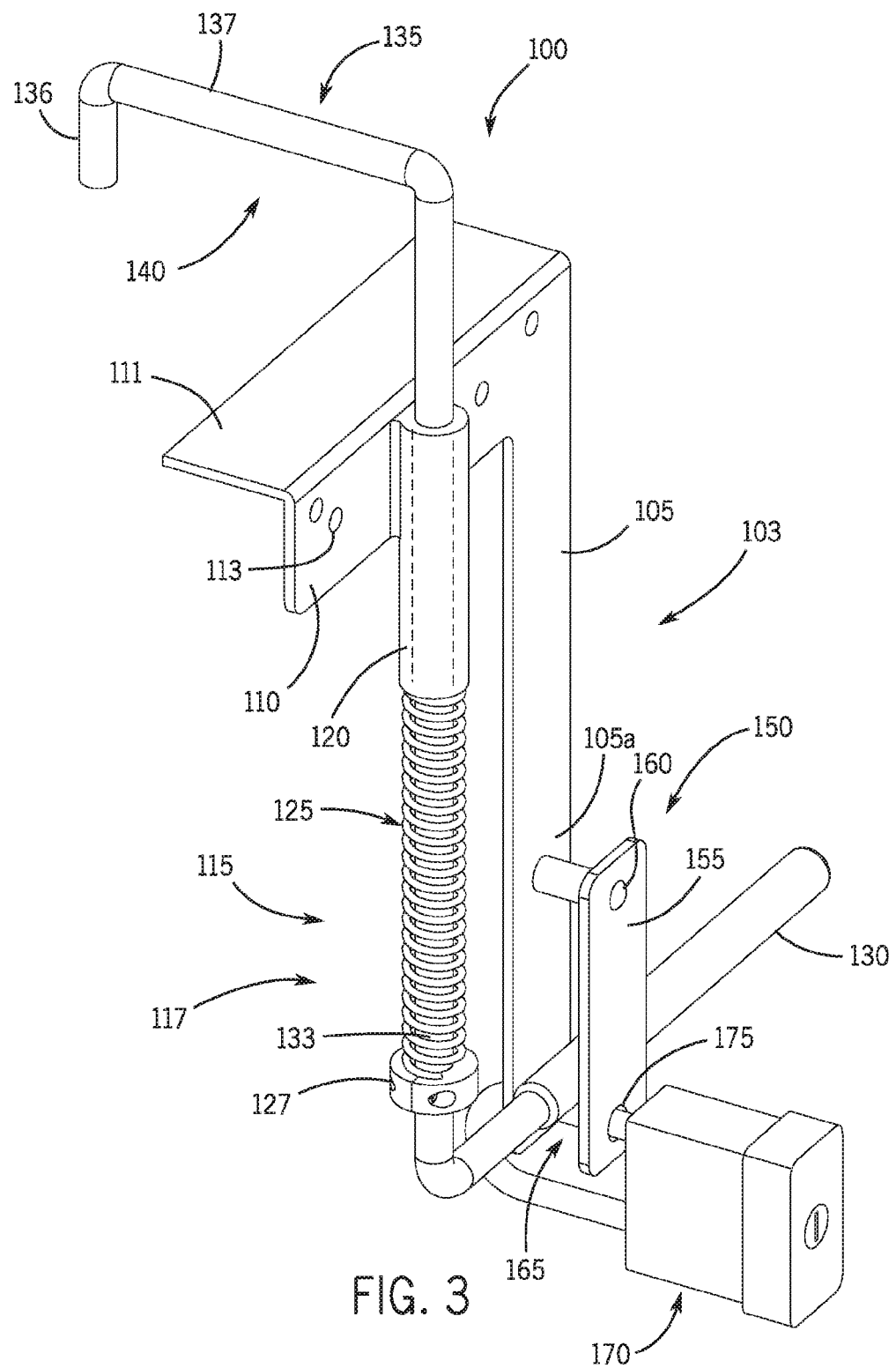
FIG. 3 is a is a perspective view of one or more embodiments of a ladder locking system.
Figure 4:
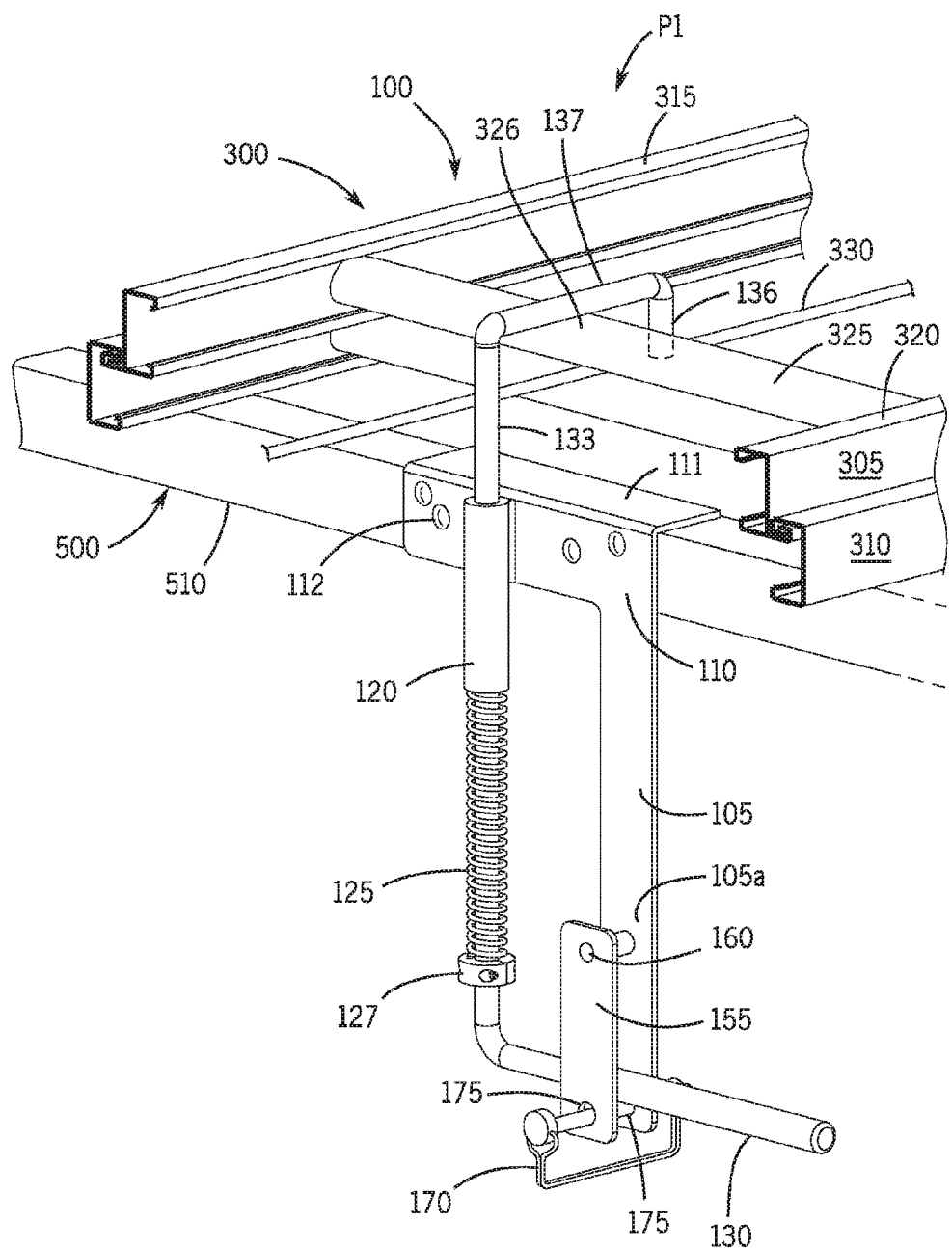
FIG. 4 is a perspective view of the ladder locking system of FIG. 3 in a secured position to secure a ladder to a ladder rack.

FIGS. 1-6 show a ladder locking system 100 of the invention that efficiently secures a ladder 300 or a similar structure to an accessory rack 500 mounted to a vehicle V (e.g., truck or van). As shown in FIGS. 3 and 4, the ladder 300 is a preferably an extension ladder with a first segment 305 in cooperative sliding arrangement with a second segment 310. The first and second segments 305, 310 include a first side rail 315 and a second side rail 320 with rungs 325 extending there between. The ladder 300 also includes a rope adjustment mechanism 330 to facilitate adjustment of the first and second ladder segments 305, 310. In the embodiment shown in the Figures, the rack 500 comprises a first vertical member 505, a horizontal member 510, a second vertical member 515 which collectively define a receiver 520 for the ladder 300. The rack 500 also includes a cross-member 525 that provides additional support, including when the ladder 300 is within the receiver 520.

Figure 5:
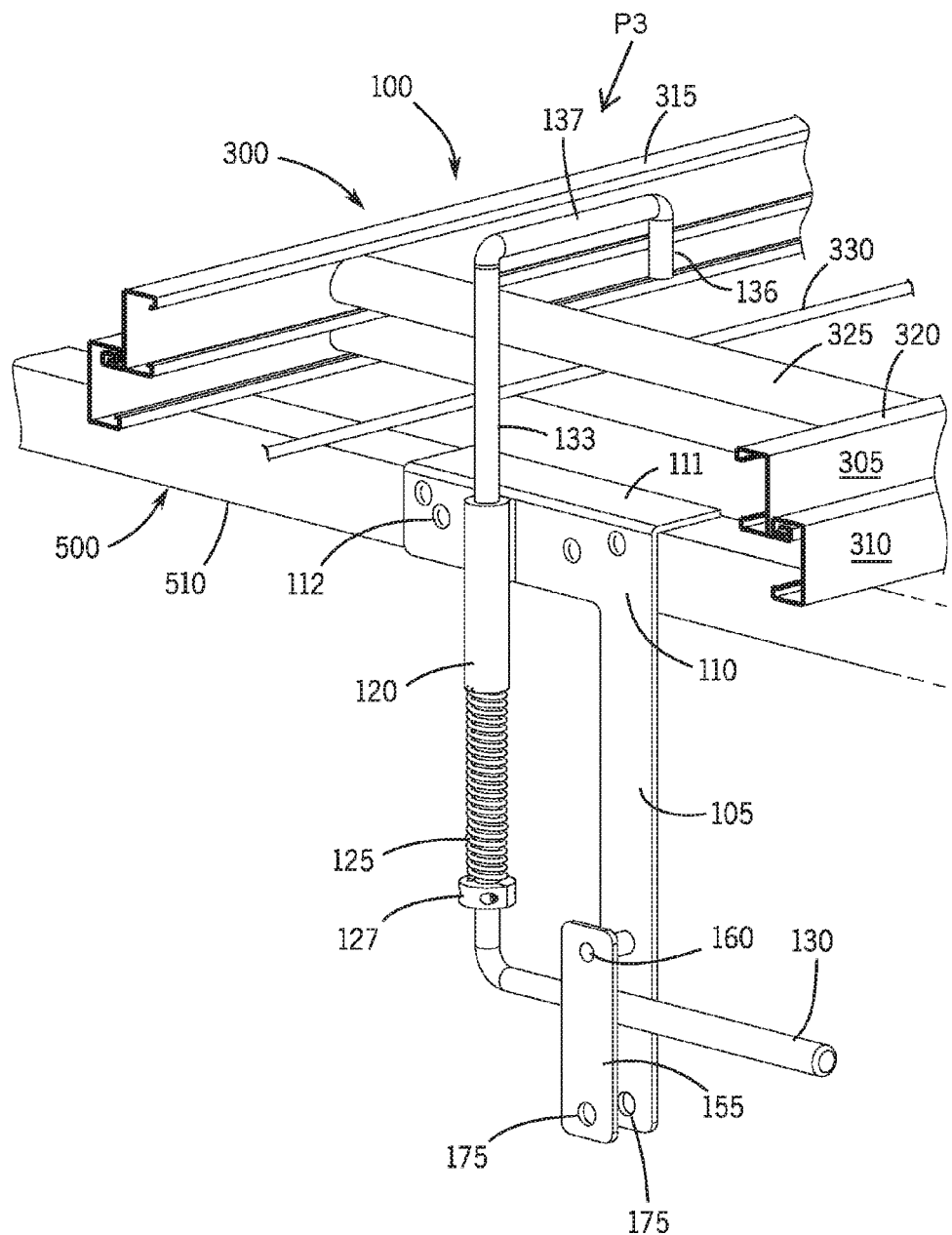
FIG. 5 is a perspective view of the ladder locking system of FIG. 3 in an intermediate position to disengage the ladder locking system from the ladder.
Figure 6:
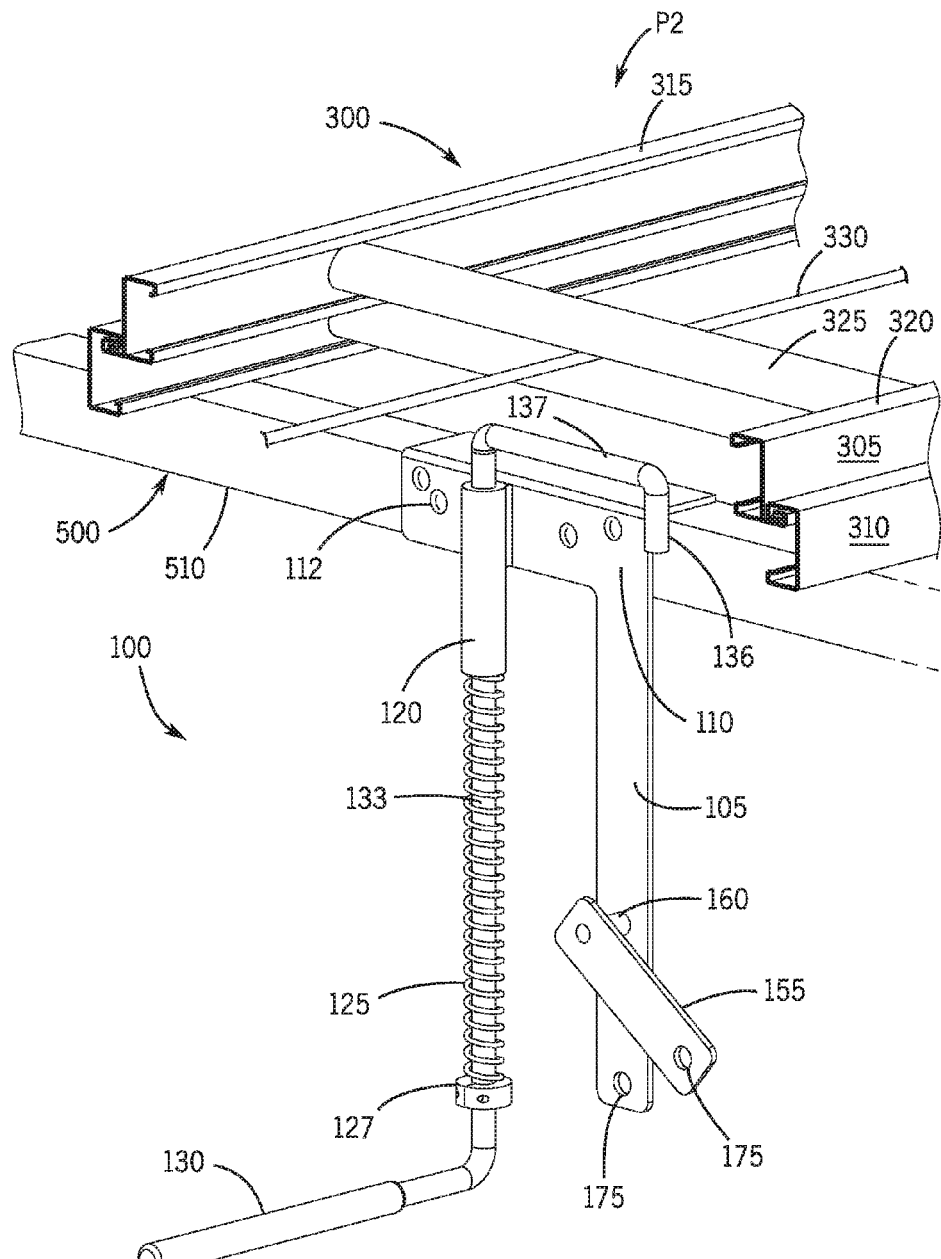
FIG. 6 is a perspective view of the ladder locking system of FIG. 3 in a released position to allow removal of a ladder from a ladder rack.

As shown in FIGS. 1, 2 and 4, the locking system 100 secures the ladder 300 to the rack 500 in a first or secured position P1, wherein the ladder 300 is prevented from moving fore or aft relative to the rack 500 and the vehicle V. The ladder 300 is also prevented from moving laterally relative to the rack 500 and the vehicle V by a downwardly directed force and engagement provided by the locking system 100, as well as the configuration of the receiver 520, namely the first and second vertical members 505, 515. As shown in FIG. 6, the locking system 100 is in a second or released position P2 wherein the ladder 300 is not engaged by the locking system 100 and thus it can be removed from the ladder rack 500 by an operator. As shown in FIG. 5, the locking system 100 moves through is an intermediate position P3 when the operator actuates the locking system 100 between the secured and released positions P1, P2 depending upon whether the ladder 300 is being readied for securement in the receiver 520 or being readied for removal from the receiver 520.

The locking system 100 includes a frame arrangement 103 comprised of a first elongated segment 105, a second elongated segment 110 and a releasable securing mechanism 115 that is configured to engage and retain the ladder 300 in the secured position P1. In the embodiment of the Figures, the first and second segment 105, 110 are oriented 90 degrees apart. The second segment 110 has a flange portion 111 that overlaps an extent of the horizontal rack member 510 and at least one fastener 112 extends through openings 113 in the second segment 110 to couple the frame 103 to the rack 500 (see FIGS. 3 and 4). The releasable securing mechanism 115 comprises an actuator 117, a sleeve 120 that slidably receives the actuator 117, a spring 125 and a spring retainer 127 that cooperatively interact for releasable engagement of the ladder 300. The actuator 117 includes a handle portion 130, an intermediate portion 133 that extends through the spring 125, and a securing member 135. The sleeve 120 is affixed to the second segment 110 and an upper extent of the intermediate portion 133 of the actuator 117 extends through the sleeve 120. The spring retainer 127 is secured to a lower extent of the intermediate portion 133 of the actuator 117. Thus, the spring 125 is positioned between the lower end of the sleeve 120 and the upper end of the spring retainer 127. As shown in the Figures, the securing member 135 is configured as a hook 140 that is dimensioned to engage an extent of the ladder 300. Preferably, the hook 140 is configured to wrap-around at least one rung 325. Alternatively, the hook 140 is configured to wrap around a portion of the side rail 315, 320. The handle 130 is actuated by the operator to move the hook 140 between the secured and released positions P1, P2 and through the intermediate position P3 while the spring 125 exerts a downwardly directed biasing force on the hook 140 (and ladder rung 325) in the first position P1.

The locking system 100 also includes an interlock mechanism 150 that is configured to receive an extent of the handle 130 when the system 100 is in the secured position P1 (see FIG. 2) to prevent unexpected or unauthorized movement from the secured position P1 to the released position P2 to allow for removal of the ladder 300. The interlock mechanism 150 includes a lower portion 105a of the first segment 105 and a flap 155 movably connected to the lower portion 105a by a fastener 160 that collectively form a channel 165 that receives an extent of the handle 130 in the secured position P1. A locking member 170 (e.g., a locking pin and ring, a padlock, and the like) extends between holes 175 formed in the bottom of the lower portion 105a and the flap 155, wherein the locking member 170 limits unwanted downward movement of the handle 130 within the channel 165. For example, in the event the operator requires greater security, the locking member 170 may be a padlock (see FIG. 3) that prevents an unauthorized third party from moving the locking system 100 from the secured position P1 to the released position P2 and then removing the ladder 300 from the rack 500.

When the locking system 100 is in the released position P2 of FIG. 6, the ladder 300 is loaded onto the rack 500 and positioned within the receiver 520 such that the rung 325 is generally aligned with the horizontal member 510, the operator engages the handle 130 and applies an upwardly directed axial force sufficient to compress the spring 125 and overcome its biasing force in order to displace an upper extent of the intermediate portion 133 upward through the sleeve 120 and elevate the hook 140 over the uppermost rung 325. Once the tongue 136 of the hook 140 is positioned above the upper surface 326 of the rung 325, the operator rotates the handle 130 such that the tongue 136 clears the upper rung surface 326 and the intermediate hook portion 137 is positioned above the rung 325 in the intermediate position P3 of FIG. 5. In a preferable embodiment, the handle is rotated 90 degrees between the released position P2 and the intermediate position P3. The operator releases the handle 130 and the spring 125 exerts a downwardly directed biasing force on the securing mechanism 115, including the intermediate portion 133 via engagement between the spring 125 and the retainer 127, causing the handle 130 to descend and the intermediate hook portion 137 to engage the upper rung surface 326 and maintain contact between ladder 300 and the rack 500 in the secured position P1 of FIG. 4. The interaction between the securing mechanism 115, namely the hook 140, the spring 125 and the rung(s) 325 retain the ladder 300 in the secured position P1. Retention of the ladder 300 in the secured position P1 prevents unwanted fore and aft movement, as well as lateral movement, of the ladder 300 relative to the rack 500. The interlock mechanism 150 and the locking member 170 are then utilized to prevent unwanted movement of the handle 130 within the channel 165. The securement process occurs at one or more locations where the ladder 300 engages the rack 500. For example, two racks 500 (e.g., one towards front of vehicle and one towards rear of vehicle) are employed to secure a single ladder 300, wherein the securement process for a single ladder 300 occurs at a first rack near the front of the vehicle V and at a second rack near the rear of the vehicle V.

To move from the secured position P1 through the intermediate position P3 to the disengaged position P2 to allow for removal of the ladder 300, the operator releases the interlock mechanism 150 to gain access to the handle 130. The operator then engages the handle 130 and applies an upwardly directed axial force to overcome the spring's biasing force and compress the spring 125 in order to elevate the hook 140 over the uppermost rung 325. Once the tongue 136 of the hook 140 is positioned above the upper surface 326 of the rung 325 in the intermediate position P3 of FIG. 5, the operator rotates the handle 130 such that the tongue 136 clears the upper rung surface 326. When the hook 140 clears the rung 325, the operator reduces the upwardly directed force thereby allowing the spring 125 to bias the upper extent of the intermediate portion 133 down through the sleeve 120 and displace the handle 130 and hook 140 away from the rung 325 to arrive at the disengaged position P2 (see FIG. 6). In this position, the intermediate hook portion 137 is generally aligned with the horizontal rack member 510, the second segment 110 of the frame arrangement 103 and below the lowermost rung 325 such that the hook 140 does not obstruct or preclude removal of the ladder 300 from the rack 500. The ladder 300 can then safely be removed from the rack 500 for its use at the jobsite or at the storage facility. When work at the jobsite is complete, the ladder 300 is loaded onto the racks 500 and the process discussed above to move from the disengaged position P2 through the intermediate position P3 is performed by the operator to secure the ladder 300 to the racks 500.

Figure 7:
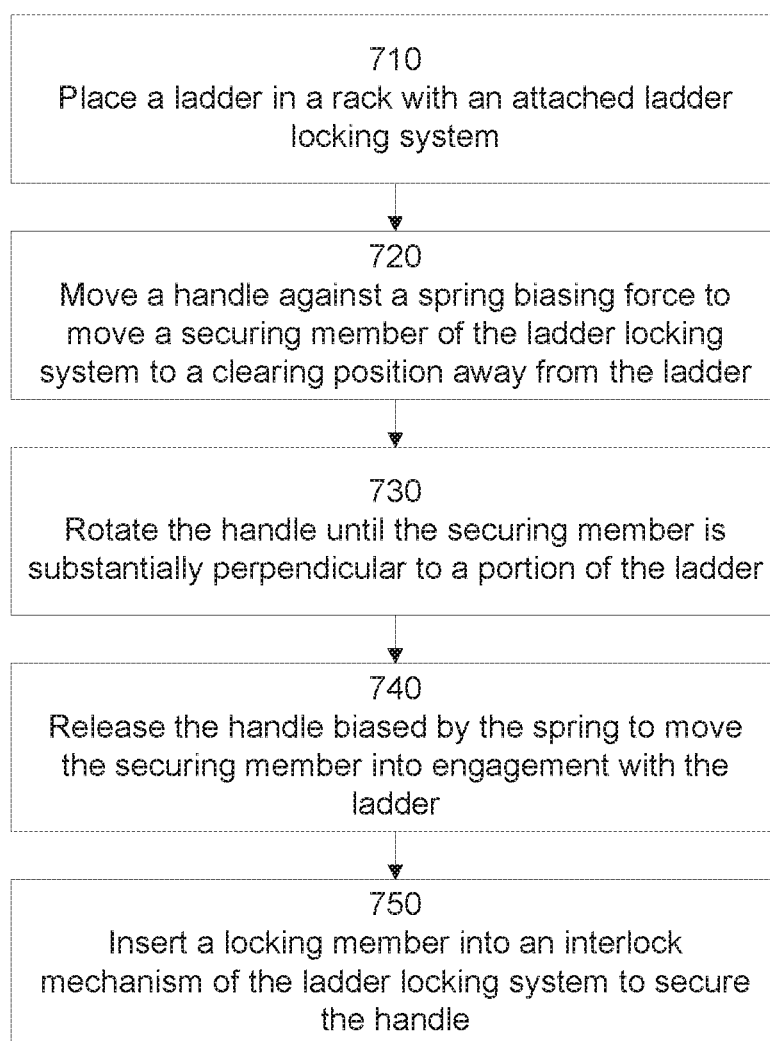
FIG. 7 is a flow chart illustrating steps in one or more embodiments of a method for securing a ladder using a ladder locking system.

As described in FIG. 7, a method 700 of securing a ladder with a ladder locking system is provided. In step 710, a first portion of a ladder is placed on a rack that is affixed to a vehicle or a storage surface to which a ladder locking system 100 is affixed. Here, the first portion of the ladder (e.g., a rung of the ladder) is placed adjacent to or in proximity to the ladder locking system. In step 720, an upwardly directed axial force opposing a spring biasing force is applied to a handle of the ladder locking system that is currently in a released position, compressing the spring and moving a securing member of the ladder locking system to a clearing position (e.g., the lowermost surface of the securing member is positioned higher than the uppermost surface of the ladder rung, providing a clearance gap between the surfaces). The handle is rotated towards an interlock mechanism of the ladder locking system in step 730, causing the securing member to rotate past the first portion of the ladder to an intermediate position. For example, the securing member may be a hook that in the clearing position is raised higher than the uppermost surface of the first portion of the ladder that is to be secured in step 720, allowing the hook to rotate without engaging the first portion of the ladder in step 730. In step 740, the handle is released and a biasing force of the spring causes the securing member to engage and retain the ladder in a secured position. For example, the hook descends and forces the first portion of the ladder against the rack. An interlock mechanism of the ladder locking system is engaged by a locking member in step 750, securing the handle within a channel of the ladder locking system. For example, a locking member may be inserted into the interlock mechanism to trap the handle and prevent the handle from rotating or sliding more than a slight amount. Multiple ladder locking systems may be used to secure multiple parts of the ladder. For example, a first ladder locking system may be used to secure one end of the ladder to a first part of a storage rack, and a second ladder locking system may be used to secure the other end of the ladder to a second part of the storage rack. Here, securing both ends of the ladder with the first and second ladder locking systems prevents the ladder from movement in any direction (e.g., fore, aft and lateral).

Figure 8:
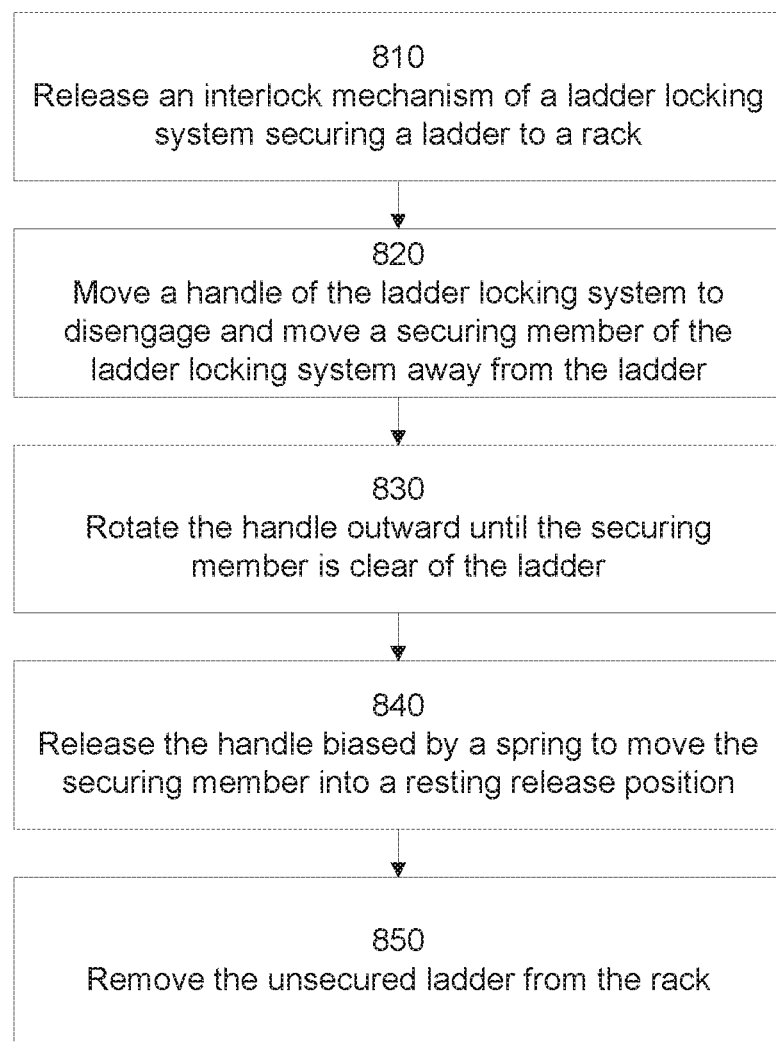
FIG. 8 is a flow chart illustrating steps in one or more embodiments of a method for disengaging a ladder using a ladder locking system.

As described in FIG. 8, a method 800 of disengaging a ladder from a ladder locking system is provided, where a ladder is secured to a rack by the ladder locking system in the secured position. In step 810, an interlock mechanism of the ladder locking system is unlocked or released (e.g., a locking pin or lock is removed) to allow a full range of sliding and rotational movement of a handle of the ladder locking system. In step 820, an anti-biasing force is applied to the handle, compressing a spring of the ladder locking system and moving a securing member of the ladder locking system to a distance away from a first portion of the ladder that is to be released (e.g., an intermediate position). For example, the intermediate position may define a gap between horizontal planes touching the lowermost point of the securing member and the uppermost point of the ladder proximate to the securing member. The handle is then rotated away from the interlock mechanism in step 830, causing the securing member to rotate away from and clear the first portion of the ladder to be released. In step 840, the handle is released and the biasing force of the spring causes the securing member to move into a resting release position (e.g., disengaged position) that does not obstruct movement of the ladder. The first portion of the ladder is removed from the rack in step 850. For example, a first ladder locking system may secure the front end of the ladder to a first rack, and a second ladder locking system may secure the rear end of the ladder to a second rack, requiring release and disengagement of both of the first and second ladder locking systems in order to remove the ladder for use.

While the specific embodiments have been illustrated and described, numerous modifications come to mind without significantly departing from the spirit of the invention and the scope of protection is only limited by the scope of the accompanying Claims. For example, the storage rack may be oriented other than in a horizontal position (e.g., vertical, at an angle between horizontal and vertical), wherein the ladder locking system affixed to the storage rack is oriented other than in a vertical position (e.g., horizontal, at an angle between horizontal and vertical). Accordingly, the movement of the handle, the intermediate portion and the securing member during securing and disengaging the ladder locking system would be other than vertically upward and downward (e.g., horizontally inward and outward).

What is claimed is:

1. A commercial grade, locking system for releasably securing a ladder to a rack coupled to a vehicle, the locking system comprising:
    a frame arrangement having a first elongated segment and a second elongated segment extending transversely from the first elongated segment;
    a releasable securing mechanism movable between a secured ladder position and a disengaged ladder position, wherein the releasable securing mechanism includes an elongated actuator and a handle; and
    an interlock mechanism comprising a flap movably connected to a lower portion of the first segment, the flap and the lower portion of the first segment defining a channel that receives an extent of the handle in the secured ladder position, wherein the channel is in parallel alignment with the lower portion of the first segment,
    wherein the actuator is vertically actuated and rotated to move the releasable securing mechanism between the secured ladder position and the disengaged ladder position to allow for removal of the ladder.

2. The locking system of claim 1, wherein the releasable securing mechanism comprises a spring, wherein the spring slidingly receives an intermediate portion of the actuator.

3. The locking system of claim 2, wherein the actuator also includes a hook, wherein the handle is actuated by an operator to move the hook between said secured and disengaged positions and the hook is configured to engage an extent of a ladder rung in the secured position.

4. The locking system of claim 2, the frame arrangement further comprising a sleeve affixed to an extent of said second segment, wherein an upper extent of the intermediate portion of the actuator extends through the sleeve, and wherein the securing mechanism is operably connected to the second segment and not to the first segment.

5. The locking system of claim 4, wherein the releasable securing mechanism further includes a lower retainer secured to a lower extent of the intermediate portion of the actuator, and wherein the spring is positioned between a lower end of the sleeve and the lower retainer.

6. The locking system of claim 1, wherein the interlock mechanism is configured to prevent movement from the secured position to the disengaged position.

7. The locking system of claim 1, wherein the first and second elongated segments extend from each other in the same plane in an L shaped configuration.

8. The locking system of claim 1, wherein the interlock mechanism also includes a locking pin and ring extending across the channel, wherein the locking pin and ring limit downward movement of the handle within the channel.

9. The locking system of claim 1, wherein the interlock mechanism also includes a lock, wherein an extent of the lock extends across the channel.

10. The locking system of claim 1, wherein the second segment of the frame arrangement includes at least one opening that is configured to receive a fastener that extends through an opening in a parallel mounting surface of the rack and secures the frame arrangement to the rack that is coupled to the vehicle, and wherein the second segment includes a flange configured to overlay a portion of a top surface of the rack.

11. A commercial grade, locking system for releasably securing a ladder to a rack coupled to a vehicle, the locking system comprising:
    a frame arrangement having a first elongated segment and a second elongated segment;
    a releasable securing mechanism joined to one of the first and second elongated segments, the releasable securing mechanism including an actuator with a handle and a hook, the releasable securing mechanism being movable between a secured ladder position and a disengaged ladder position; and
    an interlock mechanism comprising a flap movably connected to a lower portion of the first segment, the flap and the lower portion of the first segment defining a channel that receives an extent of the handle in the secured ladder position, wherein the channel is in parallel alignment with the lower portion of the first segment,
    wherein the releasable securing mechanism is actuated between the secured ladder position and the disengaged ladder position by applying a combination of a vertical force and a rotational force to the handle.

12. The locking system of claim 11, wherein the releasable securing mechanism comprises a spring, wherein an intermediate portion of the actuator is received by the spring.

13. The locking system of claim 12, wherein the handle is joined to a lower end of the intermediate portion and the hook is joined to an upper end of the intermediate portion, and wherein the hook is configured to engage an extent of a ladder rung in the secured ladder position.

14. The locking system of claim 12, the frame arrangement further comprising a sleeve affixed to an extent of said second segment, wherein an upper extent of the intermediate portion of the actuator extends through the sleeve, and wherein the securing mechanism is operably connected to the second segment and not to the first segment.

15. The locking system of claim 14, wherein the releasable securing mechanism further includes a lower retainer secured to a lower extent of the intermediate portion of the actuator, and wherein the spring is positioned between a lower end of the sleeve and the lower retainer.

16. The locking system of claim 11, wherein the interlock mechanism is configured to receive the extent of the handle in the secured position to prevent movement from the secured position to the disengaged position.

17. The locking system of claim 11, wherein the first and second elongated segments extend from each other in the same plane in an L shaped configuration.

18. The locking system of claim 11, wherein the interlock mechanism also includes a locking pin and ring extending across the channel, wherein the locking pin and ring limit downward movement of the handle within the channel.

19. The locking system of claim 11, wherein the interlock mechanism also includes a lock, wherein an extent of the lock extends across the channel.

20. The locking system of claim 11, wherein the second segment of the frame arrangement includes at least one opening that is configured to receive a fastener that extends through an opening in a parallel mounting surface of the rack and secures the frame arrangement to the rack that is coupled to the vehicle, and wherein the second segment includes a flange configured to overlay a portion of a top surface of the rack.

21. The locking system of claim 11, wherein when the locking system is in the disengaged ladder position and an operator desires to move the locking system to the secured ladder position:
    an upwardly directed vertical force is applied to the handle wherein the spring compresses and the hook is elevated above both the second elongated segment and an adjacent rung of the ladder;

a rotational force is applied to the handle wherein the hook rotates away from the second elongated segment and over the rung; and, the handle is released wherein the spring exerts a biasing force on the actuator which causes an extent of the hook to engage the rung of the ladder in the secured ladder position.

22. The locking system of claim 11, wherein when the locking system is in the secured ladder position and the operator desires to move the locking system to the disengaged ladder position:

an upwardly directed vertical force is applied to the handle wherein the spring compresses and the hook is elevated above both the second elongated segment and an adjacent rung of the ladder;

a rotational force is applied to the handle wherein the hook rotates away from the rung and over the second elongated segment; and, the handle is released wherein the hook does not engage the rung and the actuator remains in the disengaged ladder position.

23. A method of operating a ladder locking system, the method comprising:

placing a first portion of a ladder into a storage rack, the first portion of the ladder positioned adjacent a ladder locking system that is secured to the storage rack, wherein the ladder locking system is in a disengaged position;

applying an upwardly directed axial force to move a handle of the ladder locking system in the opposite direction of a biasing force of a spring of the ladder locking system, thus moving a securing member in the upward direction of the applied force to provide a clearance gap between a lowermost surface of the securing member and an uppermost surface of the first portion of the ladder;

rotating the handle into an intermediate position, the handle rotating radially about the spring so that the securing member clears and aligns substantially perpendicular with the first portion of the ladder;

releasing the handle, wherein the biasing force of the spring forces the securing member to move towards and engage the first portion of the ladder, securing the first portion of the ladder to the storage rack;

rotating a flap of an interlock mechanism of the ladder locking system into a securing position, wherein the rotated flap defines a side of a channel of the interlock mechanism and the channel is in parallel alignment with the spring; and inserting a locking member into the interlock mechanism, wherein the handle is secured within the channel of the interlock mechanism.

24. The method of claim 23, further comprising:

removing the locking member from the interlock mechanism;

applying a force to move the handle in the opposite direction of the spring biasing force;

rotating the handle axially about the spring until the securing member aligns substantially parallel with the first portion of the ladder; and releasing the handle, wherein the biasing force of the spring forces the securing member to move to a resting release position, wherein the first portion of the ladder is removable from the storage rack.

* * * * *